United States Patent [19]

Asai

[11] Patent Number: 4,670,694
[45] Date of Patent: Jun. 2, 1987

[54] CAPSTAN MOTOR CONTROL CIRCUIT

[75] Inventor: Hiroshi Asai, Sagamihara, Japan

[73] Assignee: Victor Company of Japan, Ltd., Yokohama, Japan

[21] Appl. No.: 892,354

[22] Filed: Jul. 31, 1986

[30] Foreign Application Priority Data

Aug. 5, 1985 [JP] Japan .................. 60-172042

[51] Int. Cl.$^4$ .............................................. H02P 5/00
[52] U.S. Cl. .................................... 318/258; 318/269; 318/311
[58] Field of Search ............... 318/258, 255, 256, 257, 318/261, 268, 269, 273, 301, 309, 310, 311, 329

[56] References Cited

U.S. PATENT DOCUMENTS 4,258,299 3/1981 Takeda et al. ............... 318/258
4,259,625 3/1981 Hatakeyama et al. ......... 318/283 X

FOREIGN PATENT DOCUMENTS 60-5787A  1/1985  Japan ............... 318/269
2038118A  7/1980  United Kingdom ... 318/280
2150322A  6/1985  United Kingdom ... 318/301

Primary Examiner—William M. Shoop, Jr.
Assistant Examiner—Bentsu Ro
Attorney, Agent, or Firm—Ladas & Parry

[57] ABSTRACT

A capstan motor control circuit comprises a comparing circuit for comparing an instruction voltage dependent on an instructed low-speed search mode and a rotational speed voltage dependent on a present rotational speed of a capstan motor, a circuit for detecting a rotating direction of the capstan motor and for generating a rotating direction instruction which instructs rotation in a direction opposite to a detected present rotating direction of the capstan motor, a circuit for generating a braking voltage, and a circuit responsive to an output of the comparing circuit for supplying to the capstan motor the rotating direction instruction and the braking voltage during a time period in which the rotational speed voltage is greater than the instruction voltage, and for supplying to the capstan motor the instruction voltage and a rotating direction instruction which instructs rotation in a direction identical to the present rotating direction of the capstan motor when the rotational speed voltage becomes approximately equal to the instruction voltage.

10 Claims, 17 Drawing Figures

→ TIME

→ TIME

CAPSTAN MOTOR CONTROL CIRCUIT

BACKGROUND OF THE INVENTION

The present invention generally relates to capstan motor control circuits, and more particularly to a capstan motor control circuit which controls a capstan motor depending on various modes of a video tape recorder (hereinafter simply referred to as a VTR).

A VTR has various reproducing modes such as a high-speed search mode, a normal reproduction mode, a low-speed search mode and a still reproduction mode. For example, the high-speed search mode includes modes such as a 20-times speed mode, a 15-times speed mode, a 5-times speed mode and a 2-times speed mode. On the other hand, the low-speed search mode includes modes such as a ⅓-speed search mode, a 1/10-speed search mode and a 1/30-speed search mode. The reproducing mode is selected by manipulating a search dial so that a rotational speed of a capstan motor and hence a transporting speed of a magnetic tape are variably set depending on the selected reproducing mode.

As will be described later on in the present specification in conjunction with a drawing, an example of a conventional capstan motor control circuit has a search dial which is manipulated to as to select a desired reproducing mode. When the search dial is manipulated to change the reproducing mode from a high-speed search mode to a still reproduction mode, a control device supplies to a capstan motor an instruction for rotating in a direction opposite to a direction in which the capstan motor has been rotating in response to an output of the search dial. On the other hand, a relatively large instruction voltage, that is, a braking voltage, is obtained from the control device and is supplied to the capstan motor via a differential amplifier and a driving amplifier. As a result, the rotational speed of the capstan motor is quickly decreased.

A frequency detecting element (frequency generator) detects the rotational speed of the capstan motor and generates a signal having a frequency dependent on the detected rotational speed. The output signal of the frequency detecting element is supplied to the control device and to a frequency-to-voltage converter which will be described later. Hence, when the rotational speed of the capstan motor decreases, the output signal frequency of the frequency detecting element decreases, and the control device detects the decrease in the output signal frequency of the frequency detecting element and supplies a zero instruction voltage to the capstan motor so as to stop the capstan motor.

Next, when the reproducing mode is changed from a high-speed search mode to a low-speed search mode, an instruction voltage having a level dependent on the speed of the selected low-speed search mode is obtained from the control device and is supplied to a non-inverting input terminal of the differential amplifier. In this case, the control device does not supply to the capstan motor an instruction for rotating in a direction opposite to a direction in which the capstan motor has been rotating. An output voltage of the frequency-to-voltage converter is supplied to an inverting input terminal of the differential amplifier. In this state, the voltage at the inverting input terminal of the differential amplifier is large compared to the voltage at the non-inverting input terminal thereof, and the output of the differential amplifier becomes zero. As a result, the supply of the driving voltage to the capstan motor is cut off, and the rotational speed of the capstan motor decreases gradually.

As the rotational speed of the capstan motor decreases, the output voltage of the frequency-to-voltage converter decreases gradually. When the output voltage of the frequency-to-voltage converter becomes approximately equal to the instruction voltage, the output voltage of the differential amplifier stabilizes to this instruction voltage and the capstan motor is driven by this instruction voltage.

Especially in the case where the reproducing mode is changed from the high-speed search mode to the low-speed search mode in the conventional capstan motor control circuit, the output of the differential amplifier is zero while the output voltage of the frequency-to-voltage converter is large compared to the instruction voltage. Since there are no braking voltage and no instruction for rotating the capstan motor in the opposite direction as in the case where the reproducing mode is changed from the high-speed search mode to the still reproduction mode, the conventional capstan motor control circuit suffers a problem in that it takes a long time for the VTR to assume the low-speed search mode from a time when the search dial is manipulated to change the reproducing mode.

SUMMARY OF THE INVENTION

Accordingly, it is a general object of the present invention to provide a novel and useful capstan motor control circuit in which the problems described heretofore are eliminated.

Another and more specific object of the present invention is to provide a capstan motor control circuit which can quickly change a reproducing mode of the VTR to a low-speed search mode which has been selected when the mode of the VTR is changed from a high-speed search mode to the low-speed search mode.

Still another object of the present invention is to provide a capstan motor control circuit comprising a comparing circuit for comparing an instruction voltage dependent on an instructed low-speed search mode and a rotational speed voltage dependent on a present rotational speed of a capstan motor, a rotating direction instruction generating circuit for detecting a rotating direction of the capstan motor and for generating a rotating direction instruction which instructs rotation in a direction opposite to a detected present rotating direction of the capstan motor, a braking voltage generating circuit for generating a braking voltage, and a control device responsive to an output of the comparing circuit for supplying to the capstan motor the rotating direction instruction from the rotating direction instruction generating circuit and the braking voltage from the braking voltage generating circuit during a time period in which the rotational speed voltage is greater than the instruction voltage, and for supplying to the capstan motor the instruction voltage and a rotating direction instruction which instructs rotation in a direction identical to the present rotating direction of the capstan motor when the rotational speed voltage becomes approximately equal to the instruction voltage. According to the capstan motor control circuit of the present invention, it is possible to control a capstan motor so that the VTR quickly and positively assumes a desired reproducing mode.

A further object of the present invention is to provide a capstan motor control circuit comprising a comparing circuit for comparing an instruction voltage dependent on an instructed low-speed search mode and a rotational speed voltage dependent on a present rotational speed of a capstan motor, a rotating direction instruction generating circuit for detecting a rotating direction of the capstan motor and for generating a rotating direction instruction which instructs rotation in a direction opposite to a detected present rotating direction of the capstan motor, a braking voltage generating circuit for generating a braking voltage, a speed detecting circuit for detecting whether or not the rotational speed of the capstan motor has become under a predetermined value, and a control device responsive to outputs of the comparing circuit and the speed detecting circuit. The control device supplies to the capstan motor the rotating direction instruction from the rotating direction instruction generating circuit and the braking voltage from the braking voltage generating circuit during a time period in which the rotational speed voltage is greater than the instruction voltage. The control device cuts off a supply of the braking voltage to the capstan motor and supplies to the capstan motor a rotating direction instruction which instructs rotation in a direction identical to the present rotating direction when the speed detecting circuit detects that the rotational speed of the capstan motor has become under the predetermined value. Furthermore, the control device supplies to the capstan motor the instruction voltage when the rotational speed voltage becomes approximately equal to the instruction voltage. According to the capstan motor control circuit of the present invention, it is possible to control a capstan motor so that the VTR quickly and positively assumes a desired reproducing mode.

Other objects and further features of the present invention will be apparent from the following detailed description when read in conjunction with the accompanying drawings.

DETAILED DESCRIPTION

Figure 1:
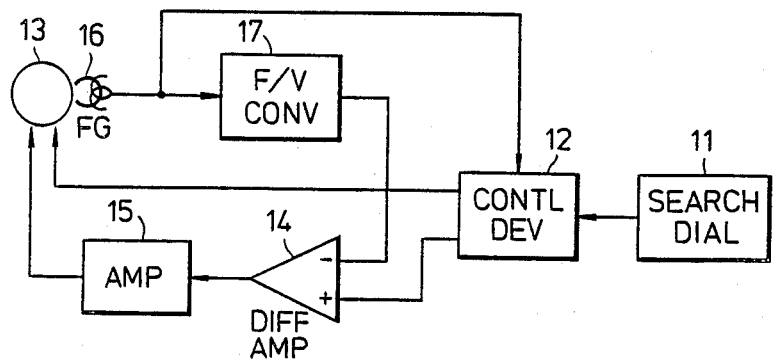
FIG. 1 is a system block diagram showing an example of a conventional capstan motor control circuit.

FIG. 1 shows an example of a conventional capstan motor control circuit. The capstan motor control circuit has a search dial 11 which is manipulated to as to select a desired reproducing mode. When the search dial 11 is manipulated to change the reproducing mode from a high-speed search mode to a still reproduction mode, a control device 12 supplies to a capstan motor 13 an instruction for rotating in a direction opposite to a direction in which the capstan motor 13 has been rotating in response to an output of the search dial 11. On the other hand, a relatively large instruction voltage, that is, a braking voltage, is obtained from the control device 12 and is supplied to the capstan motor 13 via a differential amplifier 14 and a driving amplifier 15. As a result, the rotational speed of the capstan motor 13 is quickly decreased.

A frequency detecting element (frequency generator FG) 16 detects the rotational speed of the capstan motor 13 and generates a signal having a frequency dependent on the detected rotational speed. The output signal of the frequency detecting element 16 is supplied to the control device 12 and to a frequency-to-voltage (F/V) converter 17 which will be described later. Hence, when the rotational speed of the capstan motor 13 decreases, the output signal frequency of the frequency detecting element 16 decreases, and the control device 12 detects the decrease in the output signal frequency of the frequency detecting element 16 and supplies a zero instruction voltage to the capstan motor 13 so as to stop the capstan motor 13.

Next, when the reproducing mode is changed from a high-speed search mode to a low-speed search mode, an instruction voltage having a level dependent on the speed of the selected low-speed search mode is obtained from the control device 12 and is supplied to a non-inverting input terminal of the differential amplifier 14. In this case, the control device 12 does not supply to the capstan motor 13 an instruction for rotating in a direction opposite to a direction in which the capstan motor 13 has been rotating. An output voltage of the F/V converter 17 is supplied to an inverting input terminal of the differential amplifier 14. In this state, the voltage at the inverting input terminal of the differential amplifier 14 is large compared to the voltage at the non-inverting input terminal thereof, and the output of the differential amplifier 14 becomes zero. As a result, the supply of the driving voltage to the capstan motor 13 is cut off, and the rotational speed of the capstan motor 13 decreases gradually.

As the rotational speed of the capstan motor 13 decreases, the output voltage of the F/V converter 17 decreases gradually. When the output voltage of the F/V converter 17 becomes approximately equal to the instruction voltage, the output voltage of the differential amplifier 14 stabilizes to this instruction voltage and the capstan motor 13 is driven by this instruction voltage.

Especially in the case where the reproducing mode is changed from the high-speed search mode to the low-speed search mode in the conventional capstan motor control circuit, the output of the differential amplifier 14 is zero while the output voltage of the F/V converter 17 is large compared to the instruction voltage. Since there are no braking voltage and no instruction for rotating the capstan motor 13 in the opposite direction as in the case where the reproducing mode is changed from the high-speed search mode to the still reproduction mode, the conventional capstan motor control circuit suffers a problem in that it takes a long time for the VTR to assume the low-speed search mode from a time when the search dial 11 is manipulated to change the reproducing mode.

Figure 2:
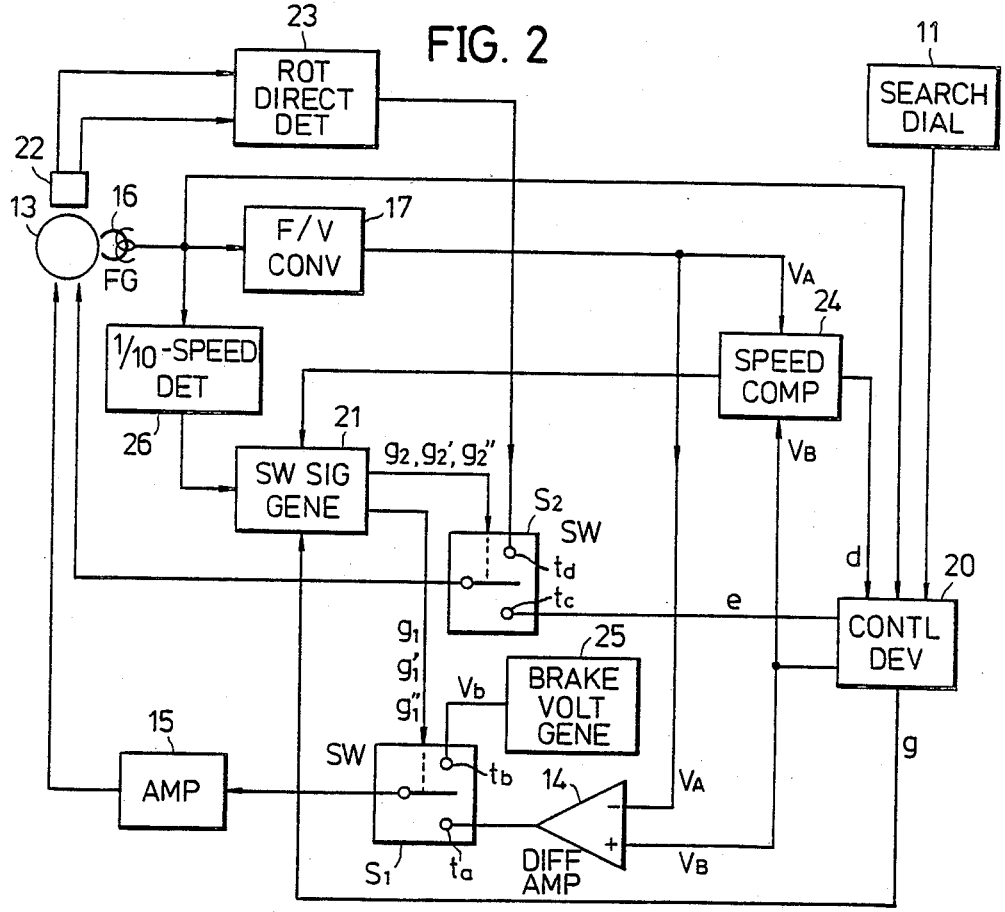
FIG. 2 is a system block diagram showing an embodiment of the capstan motor control circuit according to the present invention.
Figure 3:
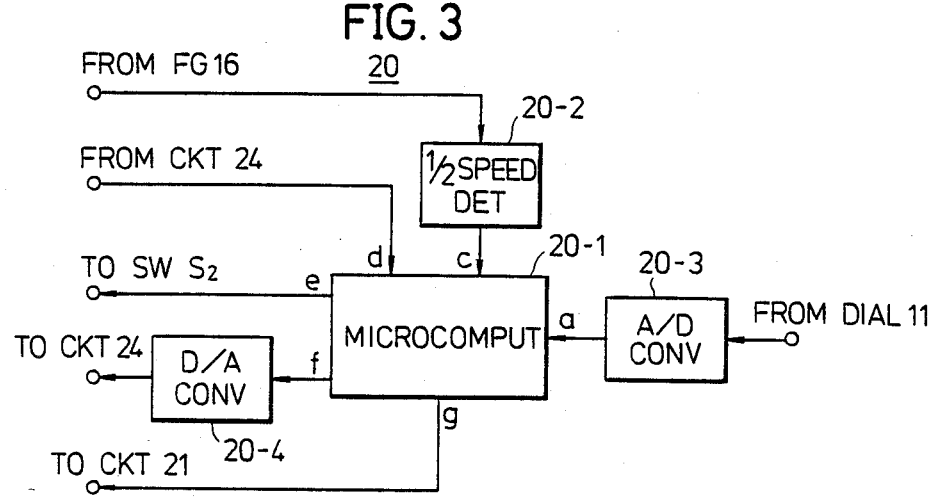
FIG. 3 is a system block diagram showing an embodiment of a control device in the block system shown in FIG. 2.

FIG. 2 shows an embodiment of the capstan motor control circuit according to the present invention. In FIG. 2, those parts which are the same as those corresponding parts in FIG. 1 are designated by the same reference numerals. A control device 20 shown in FIG. 2 generally comprises a microcomputer 20-1, a 1/2-speed detecting circuit 20-2, an analog-to-digital (A/D) converter 20-3 and a digital-to-analog (D/A) converter 20-4, as shown in FIG. 3. The microcomputer 20-1 operates in accordance with a flow chart shown in FIG. 4A when a still reproduction mode is selected, and operates in accordance with a flow chart shown in FIG. 4B when a low-speed search mode is selected, as will be described later.

In FIG. 2, it will be assumed for convenience' sake that switches S1 and S2 are initially connected to terminals ta and tc, respectively. When the search dial 11 is manipulated to change the reproducing mode of the VTR from the high-speed search mode to the still reproduction mode, a switch instruction signal g is obtained from the control device 20 and is supplied to a switching signal generating circuit 21. In this case, the switching signal generating circuit 21 generates a switching signal g2. The switch S2 is switched over and connected to a terminal td responsive to the switching signal g2.

Magnetoresistance effect elements 22 are provided in a vicinity of the capstan motor 13. Two rotational phase signals dependent on the rotational phase of the capstan motor 13 and having a mutual phase difference of 90° are obtained from these magnetoresistance effect elements 22. A rotating direction detecting circuit 23 detects the present rotating direction of the capstan motor 13 from the phase difference of the two rotational phase signals, and produces a rotating direction instruction (a low-level rotating direction instruction) for instructing rotation in a direction opposite to the present rotating direction of the capstan motor 13. The rotating direction instruction from the rotating direction detecting circuit 23 is passed through the switch S2 and is supplied to the capstan motor 13.

Figure 4A:
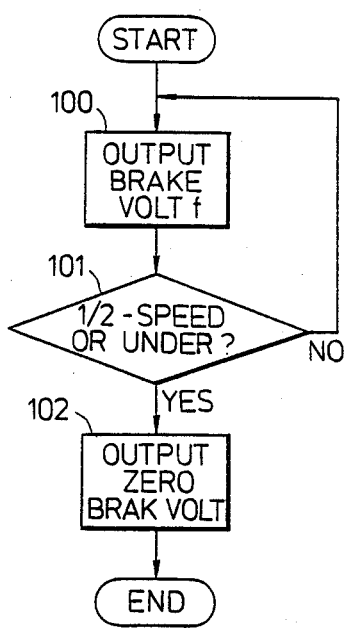
FIGS. 4A and 4B are flow charts for explaining the operation of the control device shown in FIG. 3.
Figure 4B:
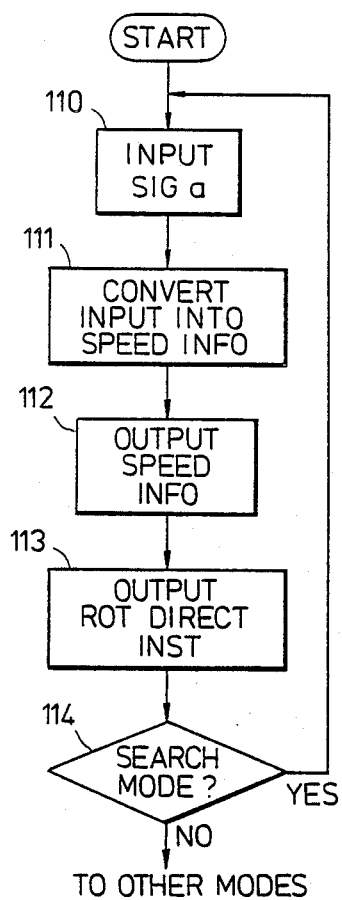

When the rotating direction instruction is supplied to the capstan motor 13 and a step 100 shown in FIG. 4A supplies a relatively large braking voltage f from the microcomputer 20-1 of the control device 20 to the capstan motor 13 via the D/A converter 20-4, the differential amplifier 14, the switch S1 and the driving amplifier 15, the rotational speed of the capstan motor 13 is quickly decreased. When the output signal frequency of the frequency generator 16 becomes under a predetermined frequency, this is detected by the ½-speed detecting circuit 20-2 of the control device 20. In other words, a step 101 discriminates whether or not the speed is a ½-speed or under, and the discrimination result is YES in this case. As a result, the braking voltage is set to zero in a step 102 and the capstan motor 13 is stopped.

Figure 5:
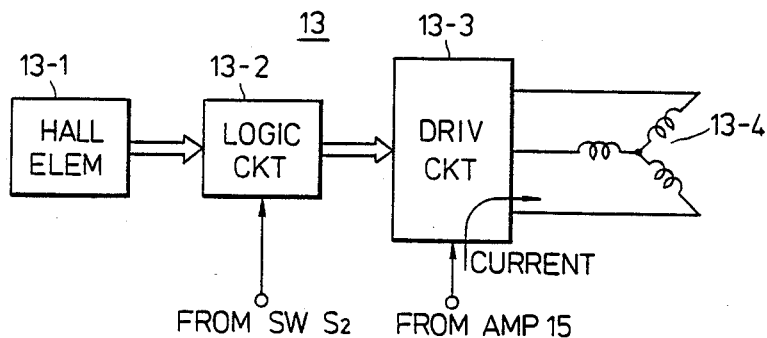
FIG. 5 is a circuit diagram showing an input circuit portion of a capstan motor in the block system shown in FIG. 2.

FIG. 5 generally shows the input circuit portion of the capstan motor 13. The capstan motor 13 generally comprises a Hall element 13-1 for detecting rotor position, a coil switching logic circuit 13-2, a driving circuit 13-3 and motor coils 13-4. The rotating direction instruction from the switch S2 is supplied to the coil switching logic circuit 13-2. The capstan motor 13 is rotated in a forward direction when the level of the rotating direction instruction is high and is rotated in a reverse direction when the level of the rotating direction instruction is low. On the other hand, the driving voltage from the driving amplifier 15 is supplied to the driving circuit 13-3 so as to drive the capstan motor 13.

Figure 6:
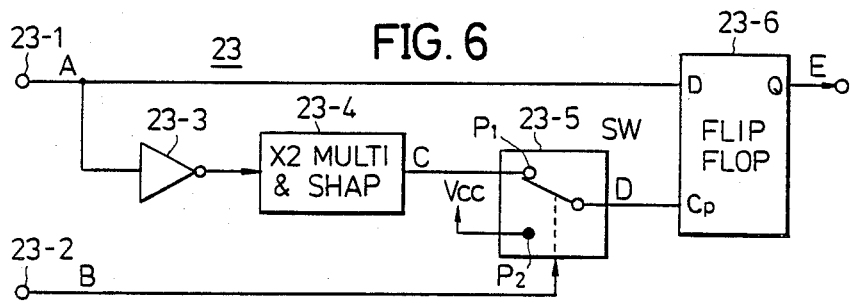
FIG. 6 is a system block diagram showing an embodiment of a rotating direction detecting circuit in the block system shown in FIG. 2.
Figure 7A:
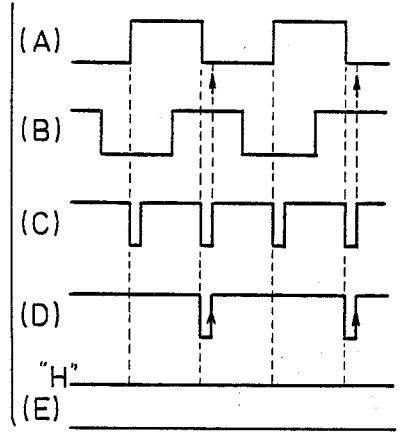
FIGS. 7A(A) through 7A(E) and FIGS. 7B(A) through 7B(E) show signal waveforms for explaining the operation of the rotating direction detecting circuit.
Figure 7B:
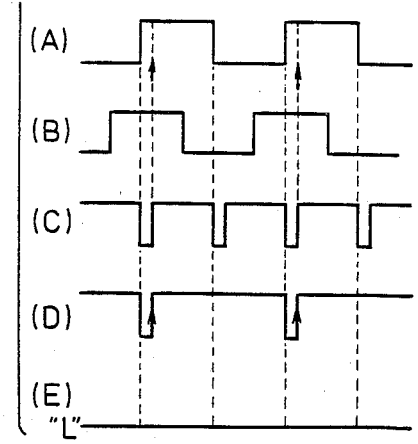

An embodiment of the rotating direction detecting circuit 23 is shown in FIG. 6. Rotational phase signals A and B from the magnetoresistance effect elements 22 are applied to terminals 23-1 and 23-2. As described before, the rotational phase signals A and B have a phase difference of 90° and this phase difference is dependent on the rotating direction of the capstan motor 13. When the capstan motor 13 rotates in the forward direction, the phase difference between the rotational phase signals A and B respectively shown in FIGS. 7A(A) and 7A(B) is +90°. On the other hand, when the capstan motor 13 rotates in the reverse direction, the phase difference between the rotational phase signals A and B respectively shown in FIGS. 7B(A) and 7B(B) is −90°. The rotational phase signal A shown in FIG. 7A(A) (or FIG. 7B(A)) is passed through an inverter 23-3 and a 2-times frequency multiplier and shaping circuit 23-4 and is formed into a signal C shown in FIG. 7A(C) (or FIG. 7B(C)). This signal C is supplied to a switch 23-5. On the other hand, the rotational phase signal B is supplied to the switch 23-5 and connects the switch 23-5 to a terminal P1 during a high-level period of the signal B and to a terminal P2 during a low-level period of the signal B. As a result, a signal D shown in FIG. 7A(D) (or FIG. 7B(D)) is obtained from the switch 23-5 and is supplied to a clock terminal Cp of a delay flip-flip 23-6. The rotational phase signal A is supplied to a data input terminal D of the flip-flop 23-6. Accordingly, a high-level signal E shown in FIG. 7A(E) is obtained from an output terminal Q of the flip-flop 23-6 during the forward rotation of the capstan motor 13, and a low-level signal E shown in FIG. 7B(E) is obtained from the output terminal Q of the flip-flop 23-6 during the reverse rotation of the capstan motor 13. Hence, it is possible to detect the rotating direction of the capstan motor 13.

Next, description will be given for the case where the reproducing mode is changed from the high-speed search mode to the low-speed search mode. For example, the reproducing mode may be changed from a 20-times speed mode to a low-speed search mode such as a ⅓-speed mode which is relatively fast for the low-speed search mode. On the other hand, the reproducing mode may be changed from the 20-times speed mode to a low-speed search mode such as a 1/10-speed mode or a 1/30-speed mode which are relatively slow. First, description will be given for the case where the reproducing mode is changed from the 20-times speed mode to the ⅓-speed mode.

When the search dial 11 is appropriately manipulated as described before, the switch S2 is connected to a terminal td and the rotating direction instruction instructing rotation in the opposite direction is produced from the rotating direction detecting circuit 23. This rotating direction instruction is supplied to the capstan motor 13 via the switch S2. On the other hand, a search speed instruction voltage $V_B$ which is in accordance with the ½-speed is obtained from the control device 20 and is supplied to a speed comparing circuit 24. The speed comparing circuit 24 compares the instruction voltage $V_B$ and an output voltage $V_A$ of the F/V converter 17. The instruction information from the search dial 11 is obtained in the form of an analog signal, and this analog signal is converted into a digital signal a in the A/D converter 20-3 before being supplied to the microcomputer 20-1 shown in FIG. 3. In other words, a step 110 shown in FIG. 4B enters the analog signal from the search dial 11 and enters the digital signal a into the microcomputer 20-1. A step 111 converts the digital signal a (instruction information) into speed information, and a step 112 outputs this speed information.

Hence, when the reproducing mode is changed from the 20-times speed mode to the ½-speed mode, the voltage $V_A$ is greater than the voltage $V_B$, and a switch instruction signal from the speed comparing circuit 24 is supplied to the switching signal generating circuit 21. A switching signal g1 from the switching signal generating circuit 21 is supplied to the switch S1.

Accordingly, the switch S1 is connected to a terminal tb and a relatively large braking voltage Vb is generated from a braking voltage generating circuit 25. The braking voltage Vb is supplied to the capstan motor 13 via the switch S1 and the driving amplifier 15. As a result, the rotational speed of the capstan motor 13 is quickly decreased by the braking voltage Vb and the rotating direction instruction from the rotating direction detecting circuit 23 instructing rotation in the opposite direction. Due to the decrease in the rotational speed of the capstan motor 13, the output voltage $V_A$ of the F/V converter 17 decreases. When the voltage $V_A$ becomes equal to the instruction voltage $V_B$, this is detected in the speed comparing circuit 24 and a switch instruction signal is supplied to the switching signal generating circuit 21 from the speed comparing circuit 24. The switching signal generating circuit 21 generates a switching signal g1', and this switching signal g1' is supplied to the switch S1 so as to switch over and connect the switch S1 to the terminal ta. On the other hand, the switching signal generating circuit 21 generates a switching signal g2', and this switching signal g2' is supplied to the switch S2 so as to switch over and connect the switch S2 to the terminal tc. Hence, the output instruction voltage $V_B$ from the differential amplifier 14 is supplied to the capstan motor 13 via the switch S1, and a rotating direction instruction e instructing rotation in the forward direction is obtained from the control device 20 and is supplied to the capstan motor 13 via the switch S2. The microcomputer 20-1 outputs the rotating direction instruction e in a step 113 shown in FIG. 4B.

Since the input voltages to the differential amplifier 14 are the same, the output voltage of the differential amplifier 14 stabilizes to the instruction voltage $V_B$. As a result, the capstan motor 13 is rotated in the forward direction at the ½-speed responsive to the instruction voltage $V_B$.

According to the capstan motor control circuit of the present invention, the capstan motor 13 is supplied with the braking voltage and the rotating direction instruction which instructs rotation in a direction opposite to the present rotating direction during a time period in which the rotational speed voltage is greater than the search speed instruction voltage. For this reason, when the reproducing mode is changed from the high-speed search mode to the low-speed search mode, the reproducing mode will quickly and positively change to the selected low-speed search mode.

Figure 8:
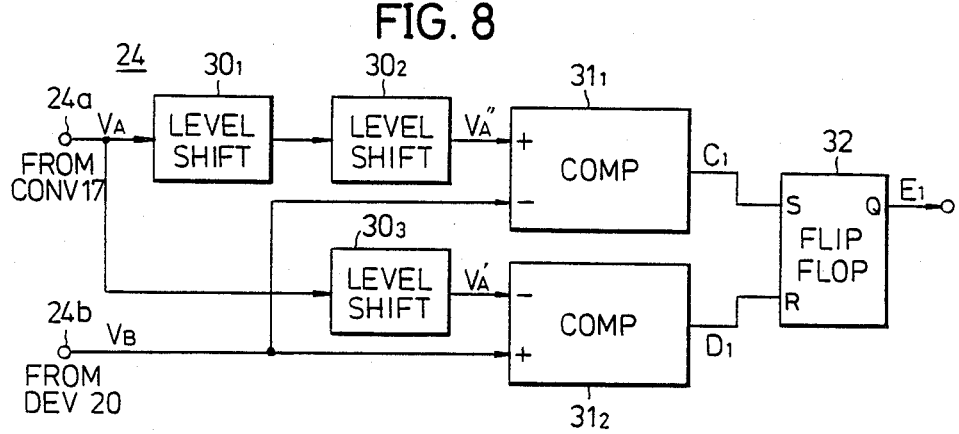
FIG. 8 is a system block diagram showing an embodiment of a speed comparing circuit in the block system shown in FIG. 2.

An embodiment of the speed comparing circuit 24 is shown in FIG. 8. It will be assumed that the capstan motor 13 is undergoing a steady state rotation at a 20-times speed, for example. The voltage $V_A$ (for example, 5 V) applied to an input terminal 24a is passed through level shifting circuits $30_1$ and $30_2$ each having a level shifting voltage $V_D$ of 0.5 V. An output voltage $V_A''$ (=4 V) of the level shifting circuit $30_2$ is supplied to a positive input terminal of a comparator $31_1$. The instruction voltage $V_B$ (for example, 5 V) applied to an input terminal 24b is supplied directly to a negative input terminal of the comparator $31_1$. Hence, an output signal Cl of the comparator $31_1$ has a low level, and this signal Cl is supplied to a set terminal S of a set-and-reset flip-flop 32. On the other hand, the instruction voltage $V_B$ from the input terminal 24b is also supplied to a positive input terminal of a comparator $31_2$. Furthermore, the voltage $V_A$ from the input terminal 24a is formed into a voltage $V_A'$ (=4.5 V) in a level shifting circuit $30_3$ which has a level shifting voltage $V_D$ of 0.5 V, and the voltage $V_A'$ is supplied to a negative input terminal of the comparator $31_2$. Consequently, an output signal Dl of the comparator $31_2$ has a high level, and this signal Dl is supplied to a reset terminal R of the flip-flop 32. Accordingly, an output signal El from an output terminal Q of the flip-flop 32 has a low level.

Next, description will be given for the case where the reproducing mode is changed from the 20-times speed mode to the ½-speed mode. In this case, the instruction voltage $V_B$ (for example, 3.8 V) is applied to the input terminal 24b, the output signal Cl of the comparator $31_1$ becomes high and the output signal Dl of the comparator $31_2$ becomes low. In addition, the output signal El of the flip-flop 32 becomes high. The signal El is supplied to the control device 20 and the switching signal generating circuit 21 as braking information.

The inputs and outputs of the comparators $31_1$ and $31_2$ and the output of the flip-flop 32 during the operations described heretofore are shown in the following table.

TABLE

| | | $V_B = 5$ V | $V_B = 3.8$ V |
|---|---|---|---|
| Input to + terminal of comparator $31_1$ | $V_A - 2V_D$ | 5 − 1 = 4 V | 4 V |
| Input to − terminal of comparator $31_1$ | $V_B$ | 5 V | 3.8 V |
| Input to + terminal of comparator $31_2$ | $V_B$ | 5 V | 3.8 V |
| Input to − terminal of comparator $31_2$ | $V_A - V_D$ | 5 − 0.5 = 4.5 V | 4.5 V |
| Signal C1 | | Low | High |
| Signal D1 | | High | Low |
| Signal E1 | | Low | High |

Figure 9A:
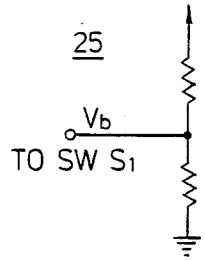
FIGS. 9A and 9B show embodiments of a braking voltage generating circuit in the block system shown in FIG. 2.
Figure 9B:
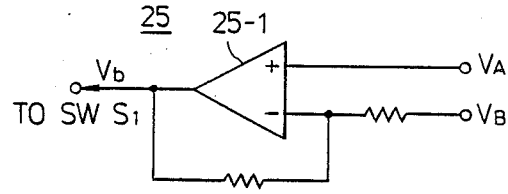

FIGS. 9A and 9B show embodiments of the braking voltage generating circuit 25. The braking voltage generating circuit 25 shown in FIG. 9A generates a fixed braking voltage $V_b$. The braking voltage generating circuit 25 shown in FIG. 9B uses a comparator 25-1 to generate a braking voltage $V_b$ dependent on the levels of the voltages $V_A$ and $V_B$.

Next, description will be given for the case where the reproducing mode is changed from the 20-times speed mode to the 1/30-speed mode. When a step 114 shown in FIG. 4B discriminates that the reproducing mode is again a search mode, the operation is returned to the step 110 and the operations described before are performed in accordance with the flow chart. In this case, when the search dial 11 is appropriately manipulated so as to change the reproducing mode from the 20-times speed mode to the 1/30-speed mode, the switch S2 is connected to the terminal td and the rotating direction instruction from the rotating direction detecting circuit 23 instructing rotation in the opposite direction is supplied to the capstan motor 13. On the other hand, the switch S1 is connected to the terminal tb and the brake voltage Vb is supplied to the capstan motor 13. The rotational speed of the capstan motor 13 is quickly decreased by the braking voltage Vb and the rotating direction instruction supplied thereto.

When the rotational speed of the capstan motor 13 decreases to a 1/10-speed, this is detected in a 1/10-speed detecting circuit 26 and a switching instruction signal is obtained therefrom. This switching instruction signal from the 1/10-speed detecting circuit 26 is supplied to the switching signal generating circuit 21, and output switching signals g1" and g2" are supplied to the respective switches S1 and S2. Accordingly, the switch S1 is connected to the terminal ta and the switch S2 is connected to the terminal tc. In this case, the output voltage $V_A$ of the F/V converter 17 supplied to the non-inverting input terminal of the differential amplifier 14 is greater than the instruction voltage $V_B$ supplied to the inverting input terminal of the differential amplifier 14, and the output voltage of the differential amplifier 14 is zero.

Because the switch S2 is connected to the terminal tc, a rotating direction instruction from the control device 20 instructing rotation in the forward direction is supplied to the capstan motor 13 via the switch S2. On the other hand, since the switch S1 is connected to the terminal ta, the zero output of the driving amplifier 15 is supplied to the capstan motor 13. Consequently, the supply of the braking voltage to the capstan motor 13 is cut off, and the rotational speed of the capstan motor 13 gradually decreases. When the output voltage $V_A$ of the F/V converter 17 becomes equal to the instruction voltage $V_B$, this is detected in the speed comparing circuit 24. As a result, the capstan motor 13 is rotated in the forward direction by the rotating direction instruction instructing rotation in the forward direction and the instruction voltage from the differential amplifier 14 corresponding to the 1/30-speed.

When the braking voltage continues to be supplied to the capstan motor 13 after the 1/10-speed is reached, the so-called hunting phenomenon may occur. This is the reason why the supply of the braking voltage is cut off at the time when the 1/10-speed is reached and the voltage is no longer supplied to the capstan motor 13.

Figure 10A:
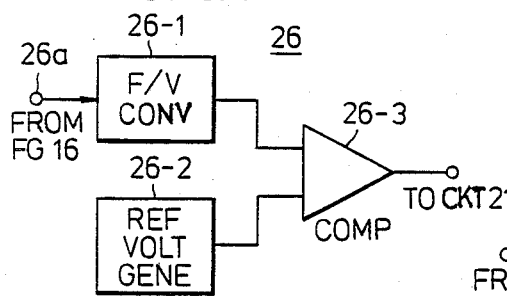
FIGS. 10A and 10B show embodiments of a 1/10-speed detecting circuit in the block system shown in FIG. 2.
Figure 10B:
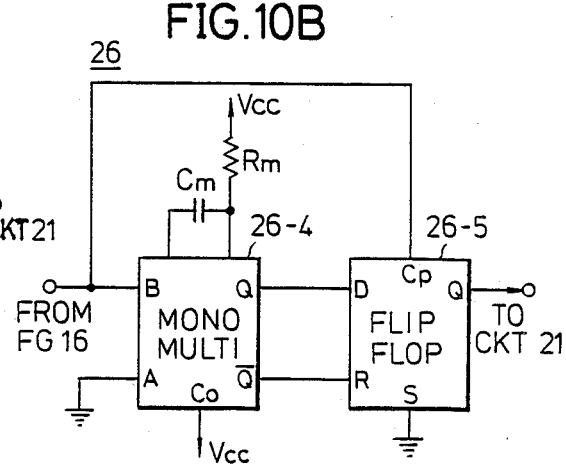

FIGS. 10A and 10B show embodiments of the 1/10-speed detecting circuit 26. In FIG. 10A, the output signal of the frequency generator 16 is applied to an input terminal 26a and is converted into a voltage dependent on the frequency of the signal in a F/V converter 26-1. The output voltage of the F/V converter 26-1 is supplied to a comparator 26-3. A reference voltage corresponding to the instruction voltage for the 1/10-speed is generated from a reference voltage generating circuit 26-2 and is supplied to the comparator 26-3.

It is detected that the 1/10-speed is reached when the two voltages supplied to the comparator 26-3 coincide. An output signal of the comparator 26-3 is supplied to the switching signal generating circuit 21.

Figure 11:
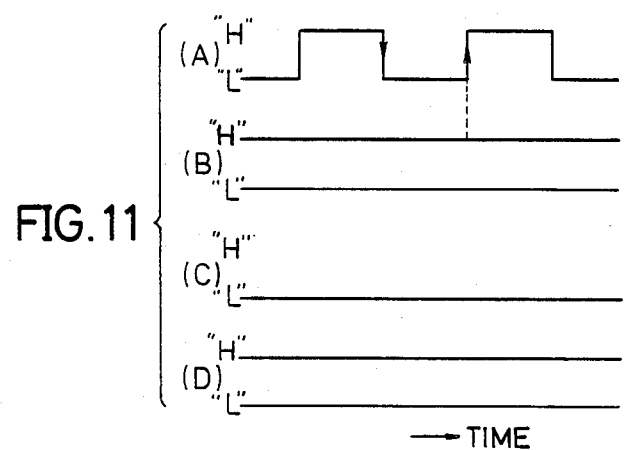
FIGS. 11(A) through 11(D) and FIGS. 12(A) through 12(D) show signal waveforms for explaining the operation of the 1/10-speed detecting circuit.

In FIG. 10B, it will first be assumed that the 1/10-speed has not been reached and the speed is higher than the 1/10-speed. In this state, a signal shown in FIG. 11(A) from the frequency generator 16 is supplied to a monostable multivibrator 26-4. However, since the period of the signal shown in FIG. 11(A) is shorter than a time constant CmRm of the monostable multivibrator 26-4 determined by a capacitor Cm and a resistor Rm, the monostable multivibrator 26-4 is constantly triggered. Thus, a signal from an output terminal Q of the monostable multivibrator 26-4 is constantly high as shown in FIG. 11(B), and a signal from an output terminal $\overline{Q}$ of the monostable multivibrator 26-4 is constantly low as shown in FIG. 11(C). On the other hand, a delay flip-flop 26-5 is operated responsive to a rising edge of the output signal of the frequency generator 16 applied to a clock input terminal Cp. As a result, the value of the signal applied to a data input terminal D of the flip-flop 26-5 at the rising edge of the output signal of the frequency generator 16 is outputted from an output terminal Q of the flip-flop 26-5 as shown in FIG. 11(D).

Figure 12:
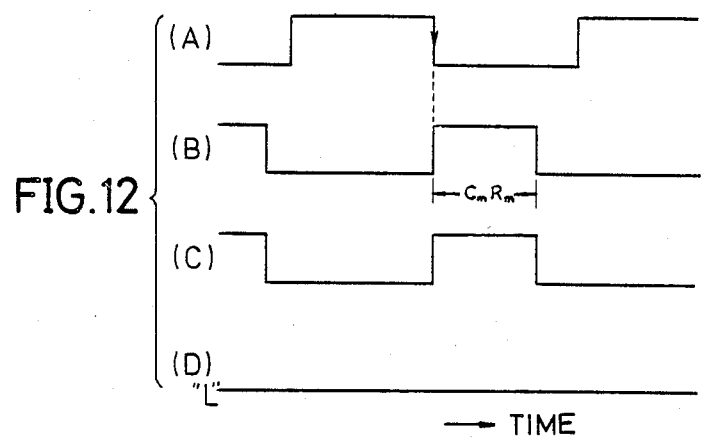

Next, when it is assumed that the speed is slower than the 1/10-speed, the period of the output signal of the frequency generator 16 shown in FIG. 12(A) is longer than the time constant CmRm of the monostable multivibrator 26-4. Hence, the signal from the output terminal Q of the monostable multivibrator 26-4 becomes high only during the time period corresponding to the time constant CmRm as shown in FIG. 12(B), and the signal from the output terminal $\overline{Q}$ of the monostable multivibrator 26-4 becomes low only during the time period corresponding to the time constant CmRm as shown in FIG. 12(C). After the time period corresponding to the time constant CmRm, the signals from the output terminals Q and $\overline{Q}$ of the monostable multivibrator 26-4 remain low and high, respectively, until the monostable multivibrator 26-4 is next triggered by the output signal of the frequency generator 16. The flip-flop 26-5 is reset by the high-level signal from the output terminal $\overline{Q}$ of the monostable multivibrator 26-4, and the signal from the output terminal Q of the flip-flop 26-5 becomes low as shown in FIG. 12(D). Therefore, it is detected that the 1/10-speed has been reached. The output signal of the flip-flop 26-5 is supplied to the switching signal generating circuit 21.

Figure 13:
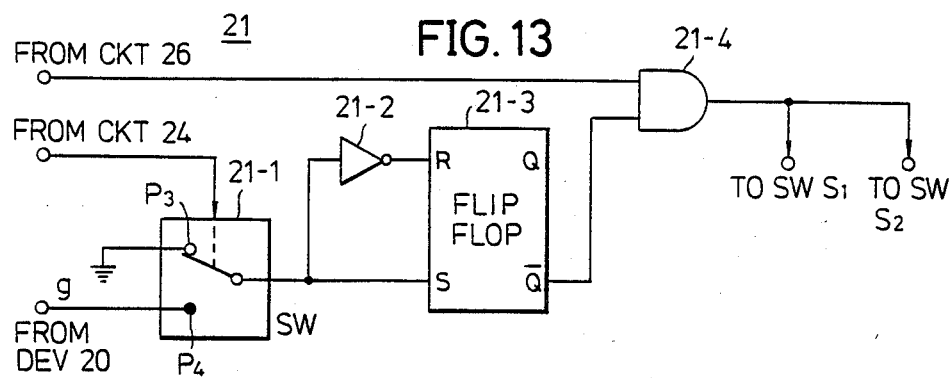
FIG. 13 is a circuit diagram showing an embodiment of a switching signal generating circuit in the block system shown in FIG. 2.

FIG. 13 shows an embodiment of the switching signal generating circuit 21. When the voltage $V_A$ is greater than the instruction voltage $V_B$, a switch 21-1 is connected to a terminal P3 responsive to the output signal of the speed comparing circuit 24. Hence, a high-level signal obtained via an inverter 21-2 and a reset-and-set flip-flop 21-3 and a high-level signal from the 1/10-speed detecting circuit 26 are supplied to an AND gate 21-4. An output signal of the AND gate 21-4 becomes high, and the switches S1 and S2 are connected to the terminals tb and td, respectively. When the speed becomes equal to the 1/10-speed, the switch 21-1 is connected to a terminal P4 responsive to the output signal of the speed comparing circuit 24. In this case, a high-level signal from the control device 20 passed through the flip-flop 21-3 (that is, a low-level signal from the flip-flop 21-3) and a low-level signal from the 1/10-speed detecting circuit 26 are supplied to the AND gate 21-4, and the output signal of the AND gate 21-4 becomes low. As a result, the switches S1 and S2 are connected to the terminals ta and tc, respectively.

When the reproducing mode is changed from the high-speed search mode to the still reproduction mode, the switch S2 is connected to the terminal td by an output signal of the control device 20 which is supplied to the switch S2 via a signal path which is omitted in FIG. 2.

During the still reproduction mode, the high-level period (braking instruction) of the signal d from the speed comparing circuit 24 is counted in the microcomputer 20-1 of the control device 20. The microcomputer 20-1 detects an abnormality in the still reproduction mode when the high-level period of the signal d is longer than a specific threshold value, and accordingly cuts off the power source to the control device 20, for example.

Further, the present invention is not limited to these embodiments, but various variations and modifications may be made without departing from the scope of the present invention.

What is claimed is:

1. A capstan motor control circuit comprising:
   comparing means for comparing an instruction voltage dependent on an instructed low-speed search mode and a rotational speed voltage dependent on a present rotational speed of a capstan motor;
   rotating direction instruction generating means for detecting a rotating direction of said capstan motor and for generating a rotating direction instruction which instructs rotation in a direction opposite to a detected present rotating direction of said capstan motor;
   braking voltage generating means for generating a braking voltage; and
   control means responsive to an output of said comparing means for supplying to said capstan motor said rotating direction instruction from said rotating direction instruction generating means and said braking voltage from said braking voltage generating means during a time period in which said rotational speed voltage is greater than said instruction voltage, and for supplying to said capstan motor said instruction voltage and a rotating direction instruction which instructs rotation in a direction identical to the present rotating direction of said capstan motor when said rotational speed voltage becomes approximately equal to said instruction voltage.

2. A capstan motor control circuit as claimed in claim 1 in which said rotating direction instruction generating means comprises magnetoresistance effect elements provided in a vicinity of said capstan motor for producing two rotational phase signals dependent on a rotational phase of said capstan motor and having a +90° or −90° phase difference depending on the rotating direction of said capstan motor, and circuit means supplied with said rotational phase signals for generating as said rotating direction instruction a signal which has high and low levels dependent on said +90° or −90° phase difference.

3. A capstan motor control circuit as claimed in claim 1 in which said braking voltage generating means comprises means for generating a fixed voltage.

4. A capstan motor control circuit as claimed in claim 1 in which said braking voltage generating means comprises means for generating a voltage dependent on a difference between said rotational speed voltage and said instruction voltage.

5. A capstan motor control circuit comprising:
   comparing means for comparing an instruction voltage dependent on an instructed low-speed search mode and a rotational speed voltage dependent on a present rotational speed of a capstan motor;
   rotating direction instruction generating means for detecting a rotating direction of said capstan motor and for generating a rotating direction instruction which instructs rotation in a direction opposite to a detected present rotating direction of said capstan motor;
   braking voltage generating means for generating a braking voltage;
   speed detecting means for detecting whether or not the rotational speed of said capstan motor has become under a predetermined value; and
   control means responsive to outputs of said comparing means and said speed detecting means for supplying to said capstan motor said rotating direction instruction from said rotating direction instruction generating means and said braking voltage from said braking voltage generating means during a time period in which said rotational speed voltage is greater than said instruction voltage, for cutting off a supply of said braking voltage to said capstan motor and supplying to said capstan motor a rotating direction instruction which instructs rotation in a direction identical to the present rotating direction when said speed detecting means detects that the rotational speed of said capstan motor has become under said predetermined value, and for supplying to said capstan motor said instruction voltage when said rotational speed voltage becomes approximately equal to said instruction voltage.

6. A capstan motor control circuit as claimed in claim 5 in which said rotating direction instruction generating means comprises magnetoresistance effect elements provided in a vicinity of said capstan motor for producing two rotational phase signals dependent on a rotational phase of said capstan motor and having a +90° or −90° phase difference depending on the rotating direction of said capstan motor, and circuit means supplied with said rotational phase signals for generating as said rotating direction instruction a signal which has high and low levels dependent on said +90° or −90° phase difference.

7. A capstan motor control circuit as claimed in claim 5 in which said braking voltage generating means comprises means for generating a fixed voltage.

8. A capstan motor control circuit as claimed in claim 5 in which said braking voltage generating means comprises means for generating a voltage dependent on a difference between said rotational speed voltage and said instruction voltage.

9. A capstan motor control circuit as claimed in claim 5 in which said speed detecting means comprises means for comparing said rotational speed voltage and a predetermined reference voltage.

10. A capstan motor control circuit as claimed in claim 5 in which said speed detecting means comprises a monostable multivibrator supplied with a predetermined signal having a frequency dependent on the present rotational speed of said capstan motor, and a flip-flip supplied with said predetermined signal and an output of said monostable multivibrator for producing a signal having different levels in correspondence with the frequency of said predetermined signal.

* * * * *